US012596489B2

(12) United States Patent
Hibe et al.

(10) Patent No.: US 12,596,489 B2
(45) Date of Patent: Apr. 7, 2026

(54) MEMORY SYSTEM AND POWER SUPPLY CONTROL CIRCUIT

(71) Applicant: Kioxia Corporation, Tokyo (JP)

(72) Inventors: Yuta Hibe, Yokohama (JP); Daiki Kamada, Kawasaki (JP); Kengo Kumagai, Yokohama (JP)

(73) Assignee: KIOXIA CORPORATION, Tokyo (JP)

( * ) Notice: Subject to any disclaimer, the term of this patent is extended or adjusted under 35 U.S.C. 154(b) by 114 days.

(21) Appl. No.: 18/433,682

(22) Filed: Feb. 6, 2024

(65) Prior Publication Data

US 2024/0281153 A1     Aug. 22, 2024

(30) Foreign Application Priority Data

Feb. 16, 2023    (JP) .................................. 2023-022669

(51) Int. Cl.
*G06F 3/06* (2006.01)

(52) U.S. Cl.
CPC .......... *G06F 3/0625* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| 8,233,346 B2 | 7/2012 | Hirota |
| 9,819,223 B2 | 11/2017 | Jeon et al. |
| 11,302,401 B2 | 4/2022 | Okako et al. |

*Primary Examiner* — Paul Yen
(74) *Attorney, Agent, or Firm* — Foley & Lardner LLP

(57)     ABSTRACT

A memory system includes a memory controller, a non-volatile memory, and a power supply control circuit configured to receive power from an external power supply. The power supply control circuit includes a backup power supply, a first converter configured to supply power to the memory controller based on power supplied from the external power supply or the backup power supply, a second converter configured to supply power to the non-volatile memory based on power supplied from the external power supply or the backup power supply, and a discharge circuit configured to discharge the power remaining in the second converter based on power remaining in the backup power supply after the supply of power from the external power supply and the backup power supply is stopped.

11 Claims, 9 Drawing Sheets

1

2

3

MEMORY SYSTEM

30

POWER SUPPLY CONTROL CIRCUIT

31

BACKUP POWER SUPPLY $L_{PLP}$

32

4

$L_{IN}$

MAIN POWER SUPPLY

CONTROL CIRCUIT

HOST

33

$L_B$

34

CONVERTER

CONVERTER $L_{OUT1}$

35

$L_{OUT2}$

DISCHARGE CIRCUIT

10

20

HB

MEMORY CONTROLLER

MB

NON-VOLATILE MEMORY

35

$L_{PLP}$             $L_{OUT2}$

R1                 R2

N1

PG

TR1                TR2

1

2

3

MEMORY SYSTEM

30

POWER SUPPLY CONTROL CIRCUIT

31

BACKUP POWER SUPPLY $L_{PLP}$

32

4

$L_{IN}$

MAIN POWER SUPPLY

CONTROL CIRCUIT

HOST

33

$L_B$

34

CONVERTER

CONVERTER $L_{OUT1}$

35A $L_{OUT2}$

DISCHARGE CIRCUIT

10

20

HB

MEMORY CONTROLLER

MB

NON-VOLATILE MEMORY

35A $L_{PLP}$          $L_{OUT1}$          $L_{OUT2}$

R1          R3          R2

N1

PG

TR3          TR2

TR1

MEMORY SYSTEM

30

POWER SUPPLY CONTROL CIRCUIT

31

BACKUP POWER SUPPLY

L$_{PLP}$

32

CONTROL CIRCUIT

33

CONVERTER

L$_{OUT1}$

35B

DISCHARGE CIRCUIT

34

CONVERTER

L$_{OUT2}$

L$_B$

4

MAIN POWER SUPPLY

L$_{IN}$

2

HOST

10

MEMORY CONTROLLER

HB

MB

20

NON-VOLATILE MEMORY

1

3

35B

L$_{PLP}$          L$_B$          L$_{OUT2}$

R1          R4          R2

N1

PG          TR4          TR2

TR1

MEMORY SYSTEM AND POWER SUPPLY CONTROL CIRCUIT

CROSS-REFERENCE TO RELATED APPLICATION

This application is based upon and claims the benefit of priority from Japanese Patent Application No. 2023-022669, filed Feb. 16, 2023, the entire contents of which are incorporated herein by reference.

FIELD

Embodiments described herein relate generally to a memory system and a power supply control circuit.

BACKGROUND

A memory system is known that includes a non-volatile memory, a memory controller, and a power supply control circuit. The non-volatile memory stores data in a non-volatile manner. The memory controller controls the non-volatile memory. The power supply control circuit supplies power to the non-volatile memory and the memory controller.

DETAILED DESCRIPTION

Figures 1, 2:
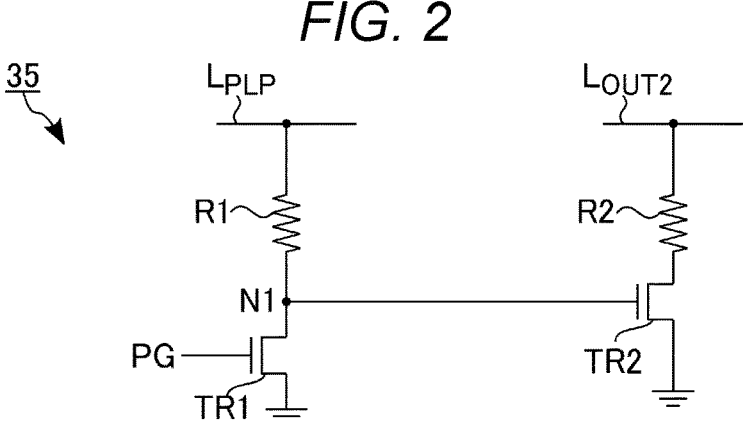
FIG. 1 is a block diagram illustrating an example of a configuration of an information processing system according to a first embodiment.
FIG. 2 is a circuit diagram illustrating an example of a configuration of a discharge circuit according to the first embodiment.

At least one embodiment provides a memory system and a power supply control circuit capable of timely entering a power-off state while reducing power consumption.

In general, according to at least one embodiment, there is provided a memory system including a memory controller, a non-volatile memory, and a power supply control circuit configured to receive power from an external power supply. The power supply control circuit includes a backup power supply, a first converter configured to supply power to the memory controller based on power supplied from the external power supply or the backup power supply, a second converter configured to supply power to the non-volatile memory based on power supplied from the external power supply or the backup power supply, and a discharge circuit configured to discharge the power remaining in the second converter based on power remaining in the backup power supply, after the supply of power from the external power supply and the backup power supply is stopped.

Hereinafter, embodiments will be described with reference to the drawings. In the following description, components having substantially the same functions and configurations are denoted by the same reference numerals. Further, the embodiments to be illustrated below illustrate the technical idea. The embodiments do not specify a material, a shape, a structure, an arrangement, and the like of the components. The embodiments may be modified in various manners.

1. First Embodiment

1.1 Configuration 1.1.1 Information Processing System

FIG. 1 is a block diagram illustrating an example of a configuration of an information processing system according to a first embodiment. The information processing system 1 includes a host 2 and a memory system 3. The host 2 and the memory system 3 are connected via a host bus HB. The host bus HB is, for example, a bus based on serial advanced technology attachment (SATA) or PCI express (PCIe™).

The host 2 is an electronic device such as a personal computer, a mobile information terminal, or a server. The host 2 includes a main power supply 4. The main power supply 4 supplies power to the memory system 3 via a power line $L_{IN}$. The main power supply 4 is, for example, an external power supply.

The memory system 3 is a storage medium such as a memory card or a solid state drive (SSD). The memory system 3 includes a memory controller 10, a non-volatile memory 20, and a power supply control circuit 30. The memory controller 10, the non-volatile memory 20, and the power supply control circuit 30 are provided on the same substrate. The memory controller 10 and the non-volatile memory 20 are connected via a memory bus MB. The memory bus MB is based on a single data rate (SDR) interface, a toggle double data rate (DDR) interface, an open NAND flash interface (ONFI), or the like, for example.

The memory controller 10 is an integrated circuit (IC) chip such as a system-on-a-chip (SoC). The memory controller 10 controls the non-volatile memory 20 based on a received request.

The non-volatile memory 20 is, for example, a NAND flash memory. The non-volatile memory 20 stores data in a non-volatile manner.

The power supply control circuit 30 is an IC chip configured to supply power to the memory controller 10 and the non-volatile memory 20.

1.1.2 Power Supply Control Circuit

Next, an internal configuration of the power supply control circuit 30 will be described with reference to FIG. 1 as well. The power supply control circuit 30 includes a backup power supply 31, a control circuit 32, a converter 33, a converter 34, and a discharge circuit 35.

The backup power supply 31 is, for example, a battery and/or a capacitor. The backup power supply 31 supplies power to the control circuit 32 via a power line $L_{PLP}$.

The control circuit 32 is a circuit that controls the power supply control circuit 30. When power is supplied from the main power supply 4 to the control circuit 32, the control circuit 32 charges the backup power supply 31 by using the power supplied from the main power supply 4, and supplies the power to the converter 33 and the converter 34 via a power line $L_B$. When power is not supplied from the main power supply 4 to the control circuit 32, the control circuit 32 uses power charged in the backup power supply 31 to supply the power to the converter 33 and the converter 34 via the power line $L_B$.

The converter 33 is a DC/DC converter. The converter 33 uses the power supplied from the control circuit 32 to supply the power to the memory controller 10 via a power line $L_{OUT1}$.

The converter 34 is a DC/DC converter. The converter 34 uses the power supplied from the control circuit 32 to supply the power to the non-volatile memory 20 via a power line $L_{OUT2}$.

The discharge circuit 35 is a circuit configured to execute a discharge operation. The discharge operation in the first embodiment is an operation of discharging the power remaining in the converter 34 via the power line $L_{OUT2}$. The discharge circuit 35 is driven by using the power supplied from the backup power supply 31.

1.1.3 Discharge Circuit

FIG. 2 is a circuit diagram illustrating an example of a configuration of a discharge circuit according to the first embodiment. The discharge circuit 35 includes a resistor R1, a resistor R2, a transistor TR1, and a transistor TR2.

The resistor R1 is, for example, a resistor having a value of 10 kΩ or more and 100 kΩ or less. The resistor R1 has a first end connected to the power line $L_{PLP}$ and a second end connected to a node N1.

The transistor TR1 is, for example, an N-type electric field effect transistor. The transistor TR1 has a first end connected to the node N1, a second end grounded to a voltage VSS, and a control end to which a signal PG is applied. The voltage VSS is, for example, 0 V. The signal PG is generated by the control circuit 32.

The resistor R2 is, for example, a resistor having a value of approximately 100 Ω (100 Ω or more and 1 kΩ or less). The resistor R2 has a first end connected to the power line $L_{OUT2}$ and a second end connected to a first end of the transistor TR2.

The transistor TR2 is, for example, an N-type electric field effect transistor. The transistor TR2 has the first end, a second end grounded to the voltage VSS, and a control end connected to the node N1.

1.2 Operation

1.2.1 Discharge Operation

Figure 3:
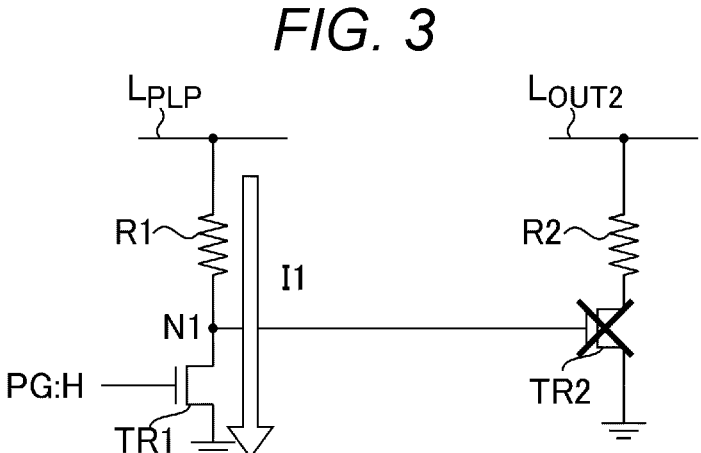
FIG. 3 is a diagram illustrating an example of a state before a discharge operation is executed in the discharge circuit according to the first embodiment.

FIG. 3 is a diagram illustrating an example of a state before a discharge operation is executed in a discharge circuit according to the first embodiment.

In a period before the discharge operation is executed, the control circuit 32 generates the signal PG of an "H" level. The transistor TR1 enters an on-state by the signal PG of the "H" level. Therefore, a current I1 flows via the resistor R1 and the transistor TR1. When the current I1 flows, a voltage at the node N1 is decreased from a voltage of the power line $L_{PLP}$ to such an extent that the transistor TR2 enters an off-state. Therefore, since the transistor TR2 is in an off-state, no current flows through the resistor R2 and the transistor TR2. Power consumed by the resistor R1 and the transistor TR1 by the current I1 is negligibly small.

Figure 4:
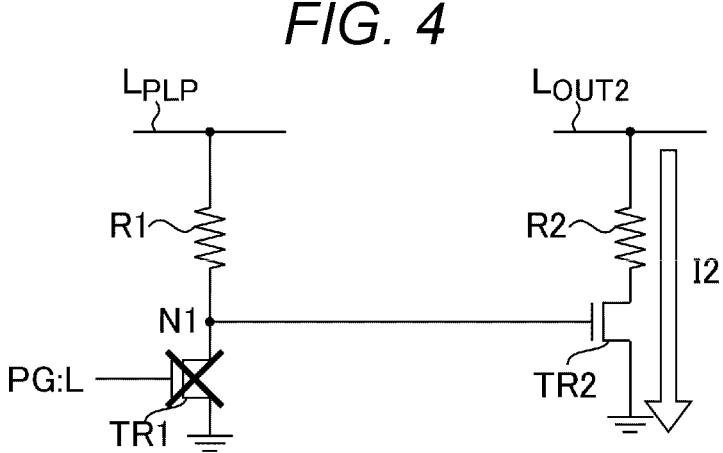
FIG. 4 is a diagram illustrating an example of a state in which the discharge operation is executed in the discharge circuit according to the first embodiment.

Next, a discharge operation in the discharge circuit 35 will be described with reference to FIG. 4. FIG. 4 is a diagram illustrating an example of a state in which a discharge operation is executed in a discharge circuit according to the first embodiment.

In a period in which the discharge operation is executed, the control circuit 32 generates the signal PG of an "L" level. The transistor TR1 enters an off-state by the signal PG of the "L" level. Thus, the current I1 does not flow through the resistor R1 and the transistor TR1. When the current I1 does not flow, a voltage at the node N1 is approximately the same as a voltage of the power line $L_{PLP}$. The transistor TR2 enters an on-state by the voltage of the power line $L_{PLP}$. Accordingly, a current I2 flows via the resistor R2 and the transistor TR2. Therefore, the power remaining in the converter 34 is consumed by the resistor R2 and the transistor TR2 via the power line $L_{OUT2}$.

1.2.2 Power-Off Operation

Figure 5:
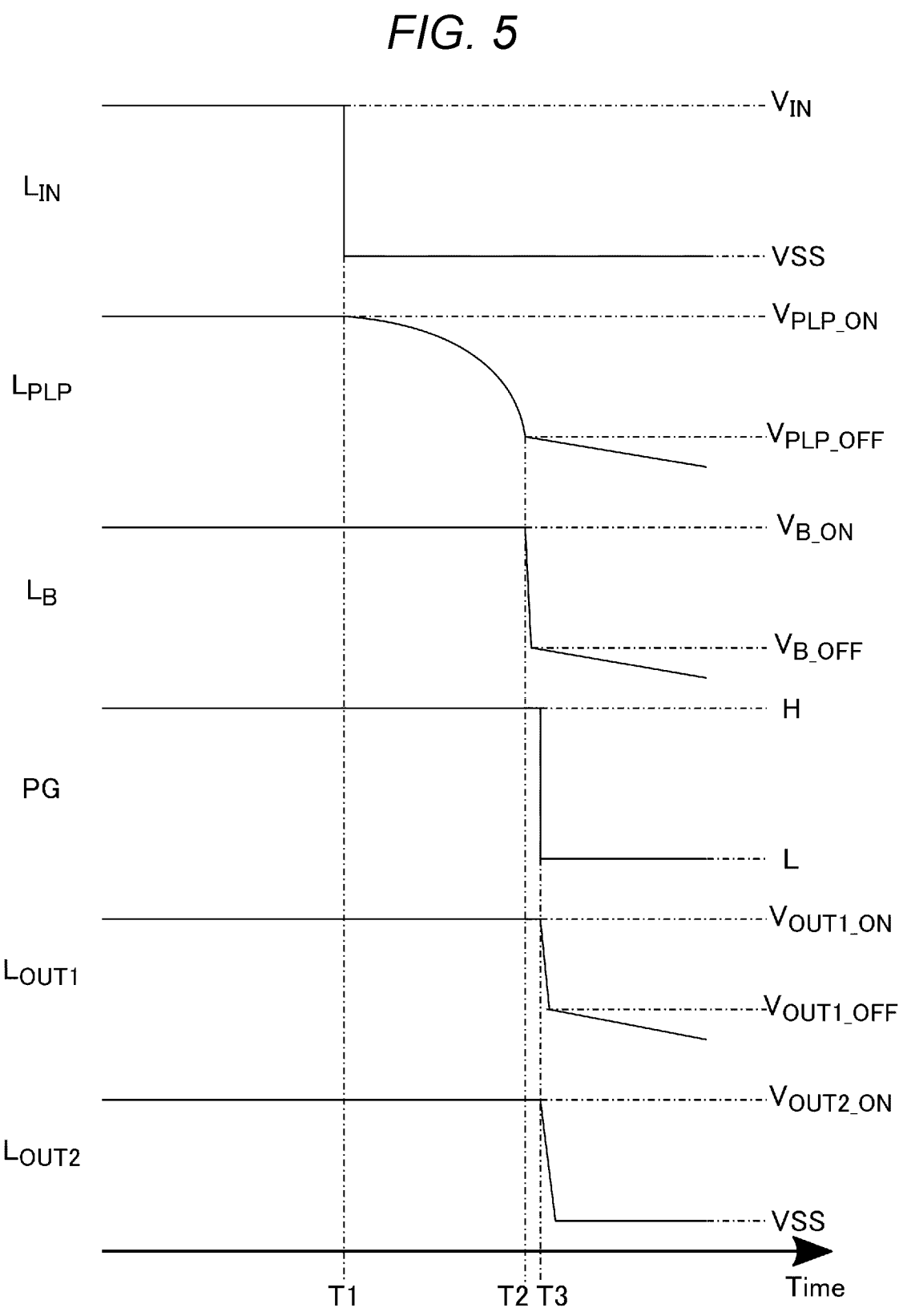
FIG. 5 is a waveform diagram illustrating an example of a power-off operation in a power supply control circuit according to the first embodiment.

FIG. 5 is a waveform diagram illustrating an example of a power-off operation in a power supply control circuit according to the first embodiment. The power-off operation is an operation for shifting the memory system 3 from a power-on state to a power-off state. FIG. 5 illustrates an example of waveforms of voltages of the power lines $L_{IN}$, $L_{PLP}$, $L_B$, $L_{OUT1}$, and $L_{OUT2}$ and a level of the signal PG during a period in which the memory system 3 transitions from the power-on state to the power-off state. A vertical axis of the waveform diagram illustrated in FIG. 5 represents a voltage. A horizontal axis of the waveform diagram illustrated in FIG. 5 represents a time.

The period during which the memory system 3 transitions from the power-on state to the power-off state includes times T1, T2, and T3. The time T1 is a time when a source of power supply to the control circuit 32 is switched from the main power supply 4 to the backup power supply 31. The time T2 is a time when the power supply from the backup power supply 31 to the control circuit 32 is stopped. The time T3 is a time when a discharge operation is started.

The main power supply 4 supplies power to the control circuit 32 until the time T1. The control circuit 32 supplies power to converter 33 and converter 34 while charging the backup power supply 31 based on the power supplied from the main power supply 4. Accordingly, a voltage $V_{IN}$ is applied to the power line $L_{IN}$. A voltage $V_{PLP\_ON}$ is applied to the power line $L_{PLP}$. A voltage $V_{B\_ON}$ is applied to the power line $L_B$. The voltage $V_{IN}$ is, for example, 12 V. The voltage $V_{PLP\_ON}$ is, for example, 28 V. The voltage $V_{B\_ON}$ is, for example, 12 V. Further, the control circuit 32 causes the converter 33 and the converter 34 to enter an on-state by using the signal PG of the "H" level. The converter 33 uses the power supplied from the control circuit 32 to supply the power to the memory controller 10. The converter 34 uses the power supplied from the control circuit 32 to supply the power to the non-volatile memory 20. Therefore, a voltage $V_{OUT1\_ON}$ is applied to the power line $L_{OUT1}$. A voltage $V_{OUT2\_ON}$ is applied to the power line $L_{OUT2}$. The voltage $V_{OUT1\_ON}$ is, for example, 0.8 V. The voltage $V_{OUT2\_ON}$ is, for example, 2.6 V.

At the time T1, the main power supply 4 stops supplying the power to the control circuit 32. Accordingly, the voltage VSS is applied to the power line $L_{IN}$.

The backup power supply 31 supplies power to the control circuit 32 from the time T1 to the time T2. The control circuit 32 supplies power to the converter 33 and the converter 34 by using the power supplied from the backup power supply 31. Accordingly, the voltage of the power line $L_{PLP}$ is decreased from the voltage $V_{PLP\_ON}$ to a voltage $V_{PLP\_OFF}$, in accordance with the consumption of the power charged in the backup power supply 31. The voltage of the power line $L_B$ is maintained at the voltage $V_{B\_ON}$. The voltage $V_{PLP\_OFF}$ is, for example, 6 V.

At the time T2, the control circuit 32 stops supplying the power to the converter 33 and the converter 34, in response to the voltage of the power line $L_{PLP}$ reaching the voltage $V_{PLP\_OFF}$. Accordingly, the voltage of the power line $L_B$ is quickly decreased to a voltage $V_{B\_OFF}$. The voltage $V_{B\_OFF}$ is, for example, 3 V. After the time T2, the voltage of the power line $L_B$ is maintained between the voltage $V_{B\_OFF}$ and the voltage VSS.

At the time T3, the control circuit 32 causes the converter 33 and the converter 34 to enter an off-state by using the signal PG of the "L" level. The discharge circuit 35 forms a discharge path in the power line $L_{OUT2}$. Accordingly, the voltage of the power line $L_{OUT2}$ is quickly decreased to the voltage VSS. The voltage of the power line $L_{OUT1}$ is quickly decreased to a voltage $V_{OUT1\_OFF}$. The voltage $V_{OUT1\_OFF}$ is, for example, 0.5 V. After the time T3, the voltage of the power line $L_{OUT1}$ is maintained between the voltage $V_{OUT1\_OFF}$ and the voltage VSS.

1.3 Effects Related to First Embodiment

With the first embodiment, the discharge circuit 35 is configured to discharge the power remaining in the converter 34 by using the power remaining in the backup power supply 31, after the power supply from the main power supply 4 is stopped. Thus, it is possible to avoid the non-volatile memory 20 from being maintained in the power-on state due to the power remaining in the converter 34 after the power-off operation. Therefore, during the power-on operation, it is possible to reduce occurrence of an error in communication between the non-volatile memory 20, which is maintained in the power-on state, and the memory controller 10, which is in the power-off state.

Further, according to the first embodiment, the discharge circuit 35 is configured with the two resistors and the two transistors. Thus, a manufacturing cost of the discharge circuit 35 can be reduced more than a manufacturing cost of a discharge circuit having a complicated circuit configuration using relays and the like.

Further, according to the first embodiment, the resistor R1 is designed to have a high resistance. Thus, it is possible to reduce the power consumed by the resistor R1 to a negligible level. Therefore, the power consumed by the power supply control circuit 30 can be reduced.

Further, according to the first embodiment, the resistor R2 is designed to have a low resistance. Thus, the power remaining in the converter 34 can be quickly discharged.

2. Second Embodiment

Next, a memory system according to a second embodiment will be described. The second embodiment is different from the first embodiment in that a discharge path is formed not only in the power line $L_{OUT2}$ but also in the power line $L_{OUT1}$. The following description mainly describes a configuration and an operation, which are different from the first embodiment. As for a configuration and an operation equivalent to the first embodiment, the description will be appropriately omitted.

2.1 Power Supply Control Circuit

Figures 6, 7:
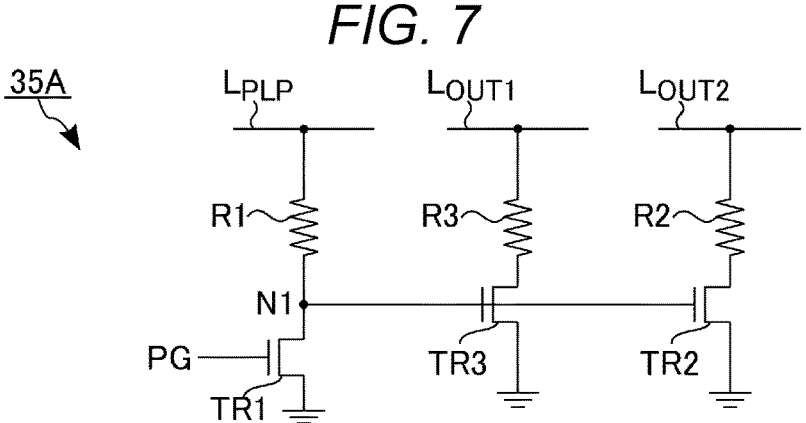
FIG. 6 is a block diagram illustrating an example of a configuration of an information processing system according to a second embodiment.
FIG. 7 is a circuit diagram illustrating an example of a configuration of a discharge circuit according to the second embodiment.

FIG. 6 is a block diagram illustrating an example of a configuration of an information processing system according to a second embodiment. FIG. 6 corresponds to FIG. 1 in the first embodiment.

The information processing system 1 according to the second embodiment includes the host 2 and the memory system 3. The memory system 3 according to the second embodiment includes the memory controller 10, the non-volatile memory 20, and the power supply control circuit 30. The power supply control circuit 30 according to the second embodiment includes the backup power supply 31, the control circuit 32, the converter 33, the converter 34, and a discharge circuit 35A. Configurations of the host 2, the memory controller 10, the non-volatile memory 20, the backup power supply 31, the control circuit 32, the converter 33, and the converter 34 have the same manner as in the first embodiment.

The discharge circuit 35A is a circuit configured to execute a discharge operation. The discharge operation in the second embodiment is an operation of discharging power remaining in the converter 33 via the power line $L_{OUT1}$, and discharging power remaining in the converter 34 via the power line $L_{OUT2}$. The discharge circuit 35A is driven based on power supplied from the backup power supply 31.

2.2 Discharge Circuit

FIG. 7 is a circuit diagram illustrating an example of a configuration of a discharge circuit according to the second embodiment. FIG. 7 corresponds to FIG. 2 in the first embodiment. The discharge circuit 35A includes the resistor R1, the resistor R2, a resistor R3, the transistor TR1, the transistor TR2, and a transistor TR3. Configurations of the resistor R1, the resistor R2, the transistor TR1, and the transistor TR2 have the same manner as in the first embodiment.

The resistor R3 is, for example, a resistor of a low resistance having a value approximately the same as a value of the resistor R2. The resistor R3 has a first end connected to the power line $L_{OUT1}$ and a second end connected to a first end of the transistor TR3.

The transistor TR3 is, for example, an N-type electric field effect transistor. The transistor TR3 has the first end, a second end grounded to the voltage VSS, and a control end connected to the node N1.

2.3 Discharge Operation

Figure 8:
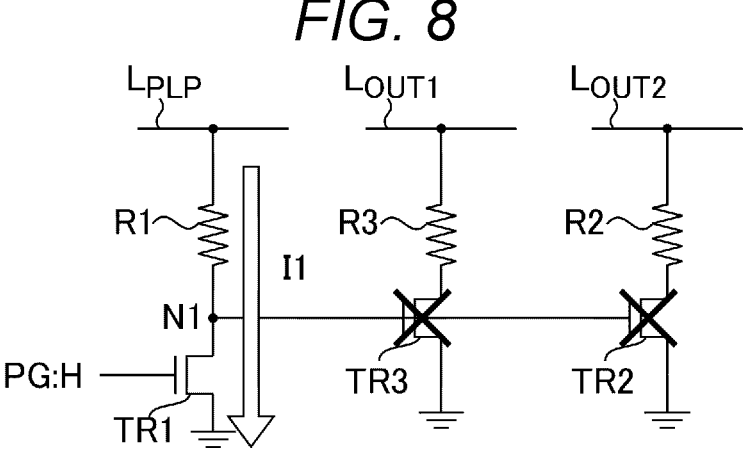
FIG. 8 is a diagram illustrating an example of a state before a discharge operation is executed in the discharge circuit according to the second embodiment.

FIG. 8 is a diagram illustrating an example of a state before a discharge operation is executed in the discharge circuit according to the second embodiment.

In a period before the discharge operation is executed, the control circuit 32 generates the signal PG of an "H" level. The transistor TR1 enters an on-state by the signal PG of the "H" level. Accordingly, a current I1 flows via the resistor R1 and the transistor TR1. When the current I1 flows, a voltage at the node N1 is decreased from a voltage of the power line $L_{PLP}$ to such an extent that the transistor TR2 and the transistor TR3 enter an off-state. Therefore, since the transistor TR2 and the transistor TR3 are in an off-state, no current flows through the resistor R2, the transistor TR2, the resistor R3, and the transistor TR3.

Figure 9:
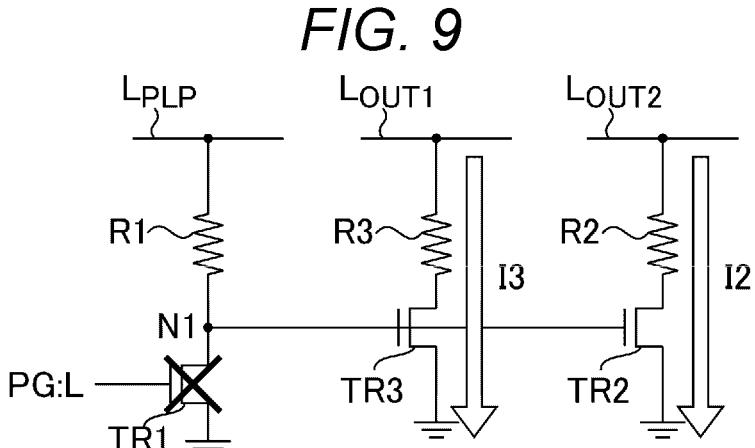
FIG. 9 is a diagram illustrating an example of a state in which the discharge operation is executed in the discharge circuit according to the second embodiment.

Next, a discharge operation in the discharge circuit 35A will be described with reference to FIG. 9. FIG. 9 is a diagram illustrating an example of a state in which a discharge operation is executed in the discharge circuit according to the second embodiment.

In a period in which the discharge operation is executed, the control circuit 32 generates the signal PG of an "L" level. The transistor TR1 enters an off-state by the signal PG of the "L" level. Thus, the current I1 does not flow through the resistor R1 and the transistor TR1. When the current I1 does not flow, a voltage at the node N1 is approximately the same as a voltage of the power line $L_{PLP}$. The transistor TR2 and the transistor TR3 enter an on-state by the voltage of the power line $L_{PLP}$. Accordingly, the current I2 flows through the resistor R2 and the transistor TR2, and a current I3 flows via the resistor R3 and the transistor TR3. Therefore, the power remaining in the converter 33 is consumed by the resistor R3 and the transistor TR3 via the power line $L_{OUT1}$, and the power remaining in the converter 34 is consumed by the resistor R2 and the transistor TR2 via the power line $L_{OUT2}$.

2.4 Power-Off Operation

Figure 10:
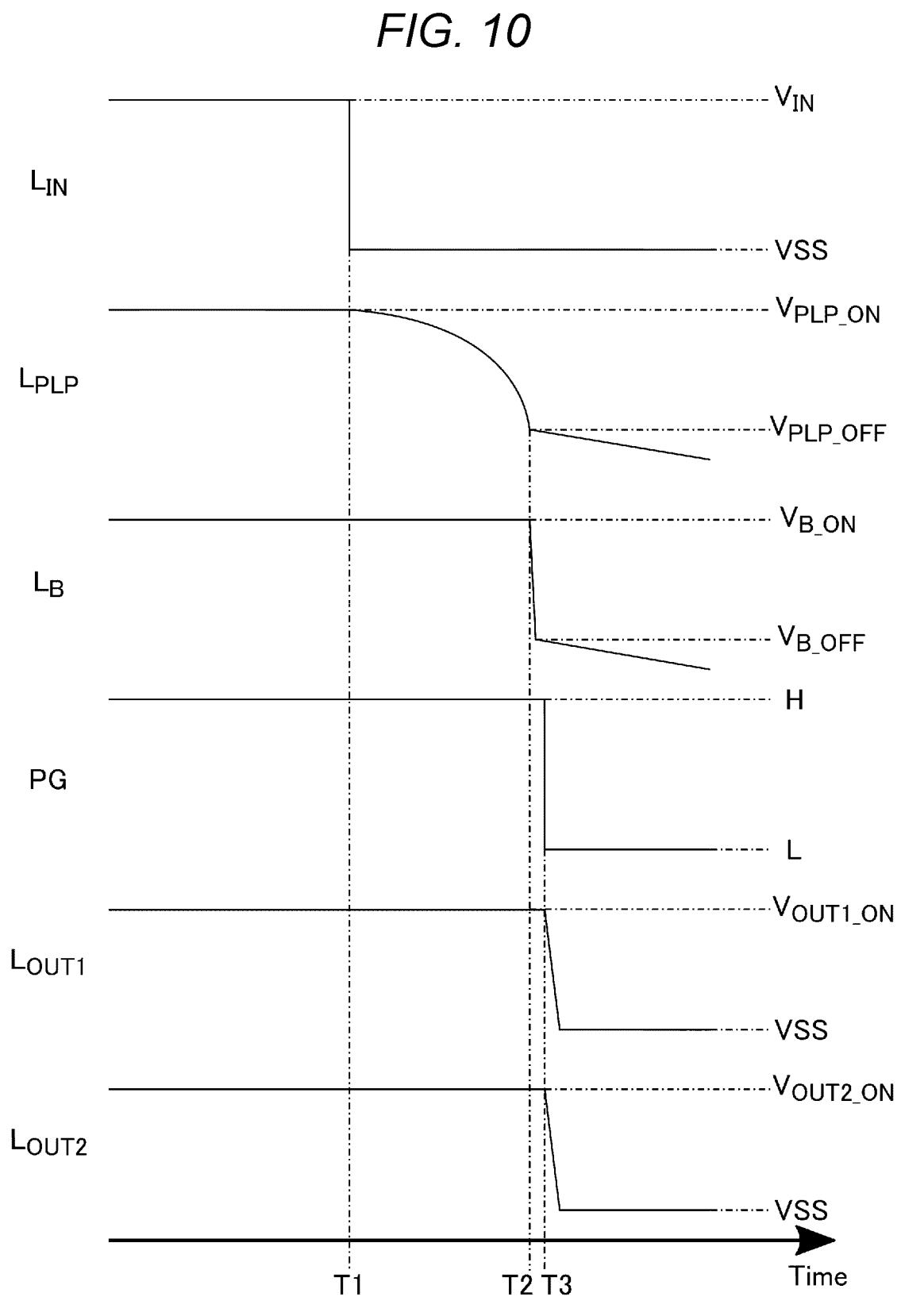
FIG. 10 is a waveform diagram illustrating an example of a power-off operation in a power supply control circuit according to the second embodiment.

FIG. 10 is a waveform diagram illustrating an example of a power-off operation in a power supply control circuit according to the second embodiment. A vertical axis of the waveform diagram illustrated in FIG. 10 represents a voltage. A horizontal axis of the waveform diagram illustrated in FIG. 10 represents a time. FIG. 10 corresponds to FIG. 5 in the first embodiment.

The power-off operation according to the second embodiment until the time T3 has the same manner as the power-off operation according to the first embodiment.

At the time T3, the control circuit 32 causes the converter 33 and the converter 34 to enter an off-state by using the signal PG of the "L" level. The discharge circuit 35 forms a discharge path in the power line $L_{OUT1}$ and the power line $L_{OUT2}$. Accordingly, the voltages of the power line $L_{OUT1}$ and the power line $L_{OUT2}$ are quickly decreased to the voltage VSS.

2.5 Effects Related to Second Embodiment

The discharge circuit 35A is configured to discharge the power remaining in the converter 33 by using the power remaining in the backup power supply 31, after the power supply from the main power supply 4 and the backup power supply 31 is stopped. Thus, it is possible to avoid the memory controller 10 from being maintained in the power-on state due to the power remaining in the converter 33 after the power-off operation. Therefore, a possibility of a communication error occurring during the power-on operation can be further reduced.

Further, according to the second embodiment, the discharge circuit 35A is configured with the three resistors and the three transistors. Thus, a manufacturing cost of the discharge circuit 35A can be reduced more than a manufacturing cost of a discharge circuit having a complicated circuit configuration using relays and the like.

Further, according to the second embodiment, the resistor R3 is designed to have a low resistance. Thus, the power remaining in the converter 33 can be quickly discharged.

3. Third Embodiment

Next, a memory system according to a third embodiment will be described. The third embodiment is different from the first embodiment in that a discharge path is formed not only in the power line $L_{OUT2}$ but also in the power line $L_B$. The following description mainly describes a configuration and an operation, which are different from the first embodiment. As for a configuration and an operation equivalent to the first embodiment, the description will be appropriately omitted.

3.1 Power Supply Control Circuit

Figures 11, 12:
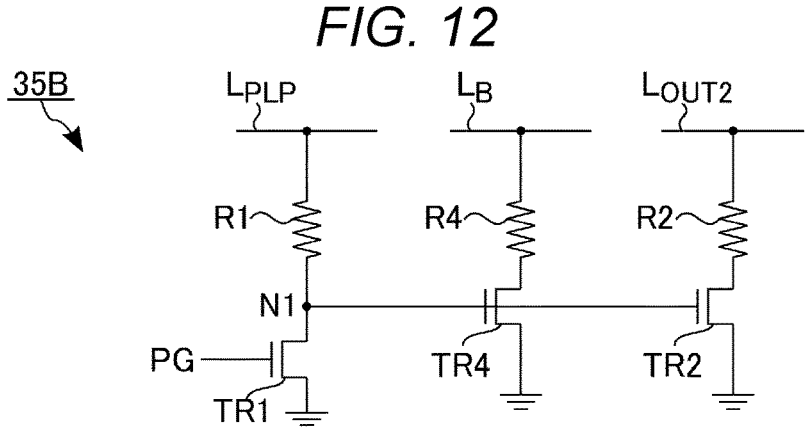
FIG. 11 is a block diagram illustrating an example of a configuration of an information processing system according to a third embodiment.
FIG. 12 is a circuit diagram illustrating an example of a configuration of a discharge circuit according to the third embodiment.

FIG. 11 is a block diagram illustrating an example of a configuration of an information processing system according to a third embodiment. FIG. 11 corresponds to FIG. 1 in the first embodiment.

The information processing system 1 according to the third embodiment includes the host 2 and the memory system 3. The memory system 3 according to the third embodiment includes the memory controller 10, the non-volatile memory 20, and the power supply control circuit 30. The power supply control circuit 30 according to the third embodiment includes the backup power supply 31, the control circuit 32, the converter 33, the converter 34, and a discharge circuit 35B. Configurations of the host 2, the memory controller 10, the non-volatile memory 20, the backup power supply 31, the control circuit 32, the converter 33, and the converter 34 have the same manner as in the first embodiment.

The discharge circuit 35B is a circuit configured to execute a discharge operation. The discharge operation in the third embodiment is an operation of discharging power remaining in the control circuit 32 via the power line $L_B$ and discharging power remaining in the converter 34 via the power line $L_{OUT2}$. The discharge circuit 35B is driven based on power supplied from the backup power supply 31.

3.2 Discharge Circuit

FIG. 12 is a circuit diagram illustrating an example of a configuration of a discharge circuit according to the third embodiment. FIG. 12 corresponds to FIG. 2 in the first embodiment. The discharge circuit 35B includes the resistor R1, the resistor R2, a resistor R4, the transistor TR1, the transistor TR2, and a transistor TR4. Configurations of the resistor R1, the resistor R2, the transistor TR1, and the transistor TR2 have the same manner as in the first embodiment.

The resistor R4 is, for example, a resistor of a low resistance having a value approximately the same as a value of the resistor R2. The resistor R4 has a first end connected to the power line $L_B$ and a second end connected to a first end of the transistor TR4.

The transistor TR4 is, for example, an N-type electric field effect transistor. The transistor TR4 has the first end, a second end grounded to the voltage VSS, and a control end connected to the node N1.

3.3 Discharge Operation

Figure 13:
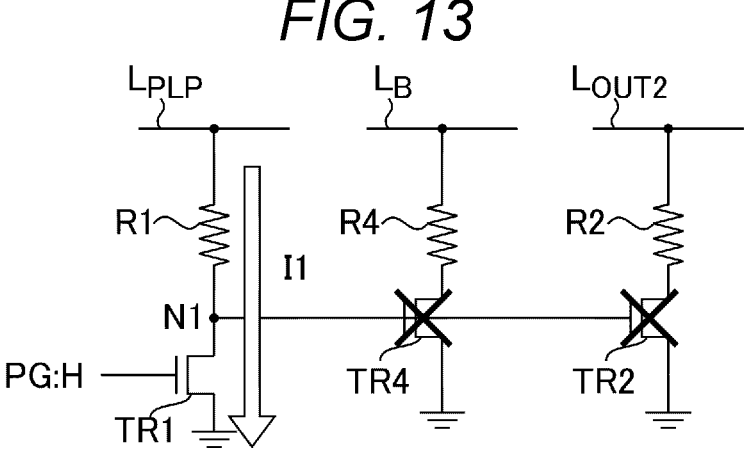
FIG. 13 is a diagram illustrating an example of a state before a discharge operation is executed in the discharge circuit according to the third embodiment.

FIG. 13 is a diagram illustrating an example of a state before a discharge operation is executed in the discharge circuit according to the third embodiment.

In a period before the discharge operation is executed, the control circuit 32 generates the signal PG of an "H" level. The transistor TR1 enters an on-state by the signal PG of the "H" level. Accordingly, a current I1 flows via the resistor R1 and the transistor TR1. When the current I1 flows, a voltage at the node N1 is decreased from a voltage of the power line $L_{PLP}$ to such an extent that the transistor TR2 and the transistor TR4 enter an off-state. Therefore, since the transistor TR2 and the transistor TR4 are in an off-state, no current flows through the resistor R2, the transistor TR2, the resistor R4, and the transistor TR4.

Figure 14:
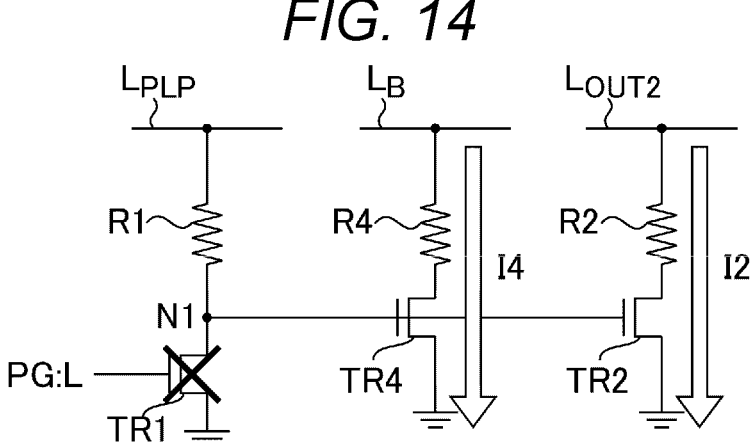
FIG. 14 is a diagram illustrating an example of a state in which the discharge operation is executed in the discharge circuit according to the third embodiment.

Next, a discharge operation in the discharge circuit 35B will be described with reference to FIG. 14. FIG. 14 is a diagram illustrating an example of a state in which a discharge operation is executed in the discharge circuit according to the third embodiment.

In a period in which the discharge operation is executed, the control circuit 32 generates the signal PG of an "L" level. The transistor TR1 enters an off-state by the signal PG of the "L" level. Thus, the current I1 does not flow through the resistor R1 and the transistor TR1. When the current I1 does not flow, a voltage at the node N1 is approximately the same as a voltage of the power line $L_{PLP}$. The transistor TR2 and the transistor TR4 enter an on-state by the voltage of the power line $L_{PLP}$. Accordingly, the current I2 flows through the resistor R2 and the transistor TR2, and a current I4 flows via the resistor R4 and the transistor TR4. Therefore, the power remaining in the control circuit 32 is consumed by the resistor R4 and the transistor TR4 via the power line $L_B$, and the power remaining in the converter 34 is consumed by the resistor R3 and the transistor TR3 via the power line $L_{OUT2}$.

3.4 Power-Off Operation

Figure 15:
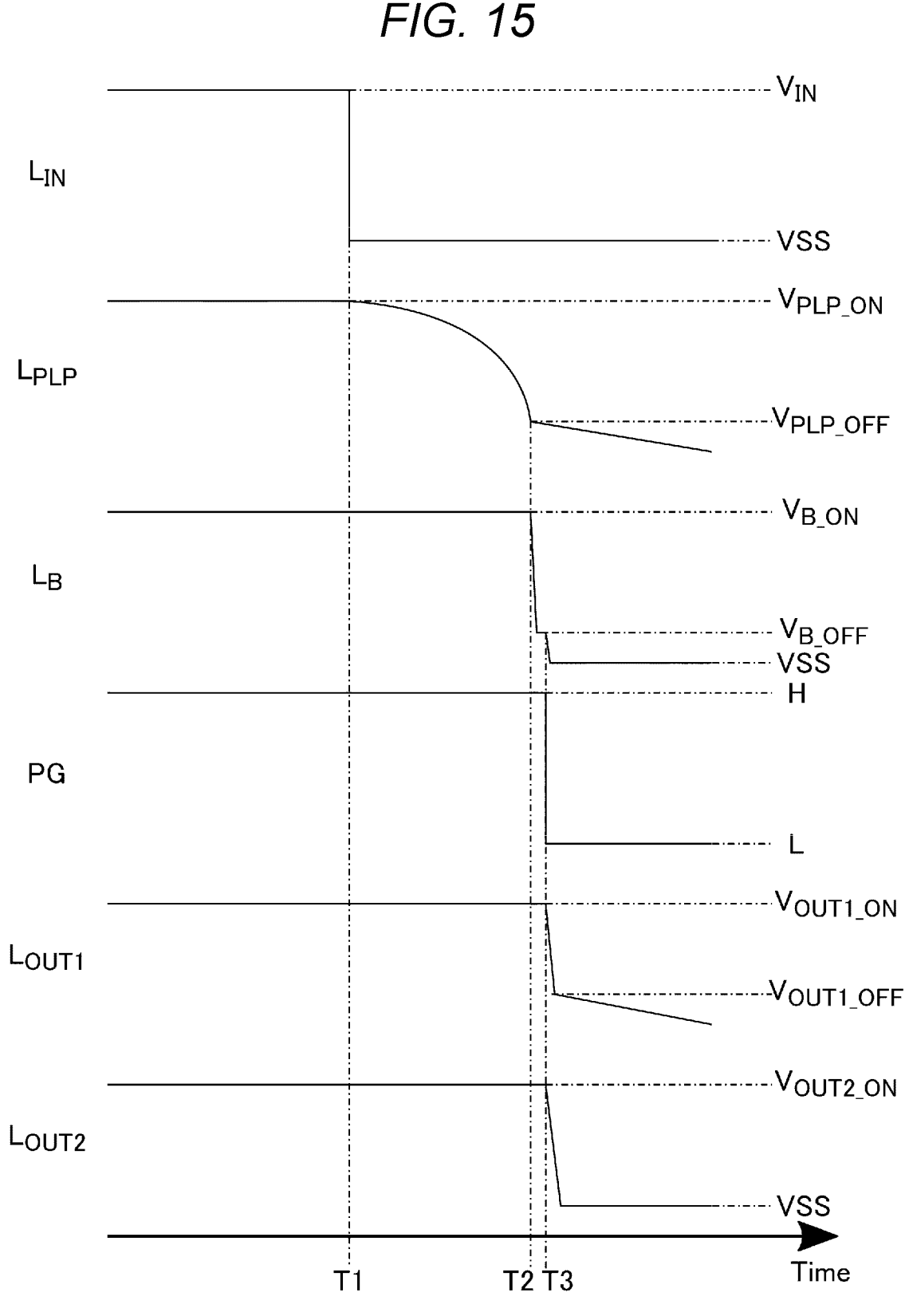
FIG. 15 is a waveform diagram illustrating an example of a power-off operation in a power supply control circuit according to the third embodiment.

FIG. 15 is a waveform diagram illustrating an example of a power-off operation in a power supply control circuit according to the third embodiment. A vertical axis of the waveform diagram illustrated in FIG. 15 represents a voltage. A horizontal axis of the waveform diagram illustrated in FIG. 15 represents a time. FIG. 15 corresponds to FIG. 5 in the first embodiment.

The power-off operation according to the third embodiment until the time T3 has the same manner as the power-off operation according to the first embodiment.

At the time T3, the control circuit 32 causes the converter 33 and the converter 34 to enter an off-state by using the signal PG of the "L" level. The discharge circuit 35 forms a discharge path in the power line $L_B$ and the power line $L_{OUT2}$. Accordingly, the voltages of the power line $L_B$ and the power line $L_{OUT2}$ are quickly decreased to the voltage VSS. The voltage of the power line $L_{OUT1}$ is quickly decreased to the voltage $V_{OUT1\_OFF}$. After the time T3, the voltage of the power line $L_{OUT1}$ is maintained between the voltage $V_{OUT1\_OFF}$ and the voltage VSS.

3.4 Effects Related to Third Embodiment

The discharge circuit 35B is configured to discharge the power remaining in the control circuit 32 by using the power remaining in the backup power supply 31, after the power supply from the main power supply 4 and the backup power supply 31 is stopped. Thus, it is possible to avoid the converter 33 and the converter 34 from being maintained in the power-on state due to the power remaining in the control circuit 32 after the power-off operation. Therefore, a possibility of a communication error occurring during the power-on operation can be further reduced.

Further, according to the third embodiment, the discharge circuit 35B is configured with the three resistors and the three transistors. Thus, a manufacturing cost of the discharge circuit 35B can be reduced more than a manufacturing cost of a discharge circuit having a complicated circuit configuration using relays and the like.

Further, according to the third embodiment, the resistor R4 is designed to have a low resistance. Thus, the power remaining in the control circuit 32 can be quickly discharged.

The embodiments are examples, and the scope of the disclosure is not limited thereto.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a memory controller;
   a non-volatile memory; and
   a power supply control circuit configured to receive power from an external power supply,
   wherein the power supply control circuit includes:
      a backup power supply;
      a first converter configured to supply power to the memory controller based on power supplied from the external power supply or the backup power supply;
      a second converter configured to supply power to the non-volatile memory based on power supplied from the external power supply or the backup power supply, and
      a discharge circuit configured to discharge power remaining in the second converter based on power remaining in the backup power supply, after the supply of power from the external power supply and the backup power supply is stopped, wherein the discharge circuit includes:
         a first resistor having a first end connected to the backup power supply;
         a first transistor connected in series to the first resistor;
         a second resistor having a first end connected between the first converter and the non-volatile memory; and a second transistor connected in series to the second resistor, the second transistor having a control end connected between the first resistor and the first transistor.

2. The memory system according to claim 1, wherein a resistance value of the first resistor is 10 kΩor more and 100 kΩ or less.

3. The memory system according to claim 1, wherein a resistance value of the second resistor is 100 Ω or more and 1 kΩ or less.

4. The memory system according to claim 1, wherein the discharge circuit is configured to discharge the power remaining in the first converter based on the power remaining in the backup power supply, after the supply of power from the external power supply and the backup power supply is stopped.

5. The memory system according to claim 4, wherein the discharge circuit includes:

a first resistor having a first end connected to the backup power supply;

a first transistor connected in series to the first resistor;

a second resistor having a first end connected between the first converter and the non-volatile memory;

a second transistor connected in series to the second resistor, the second transistor having a control end connected between the first resistor and the first transistor;

a third resistor having a first end connected between the second converter and the memory controller; and a third transistor connected in series to the third resistor, the third transistor having a control end connected between the first resistor and the first transistor.

6. The memory system according to claim 1, further comprising:

a control circuit configured to supply power to the first converter and the second converter based on power supplied from the external power supply or the backup power supply, wherein the discharge circuit is configured to discharge the power remaining in the control circuit based on the power remaining in the backup power supply, after the supply of power from the external power supply and the backup power supply is stopped.

7. The memory system according to claim 6, wherein the discharge circuit includes:

a first resistor having a first end connected to the backup power supply;

a first transistor connected in series to the first resistor;

a second resistor having a first end connected between the first converter and the non-volatile memory;

a second transistor connected in series to the second resistor, the second transistor having a control end connected between the first resistor and the first transistor;

a fourth resistor having a first end connected between the control circuit and the first converter and the second converter; and a fourth transistor connected in series to the fourth resistor, the fourth transistor having a control end connected between the first resistor and the first transistor.

8. A power supply control circuit comprising:

a backup power supply;

a converter configured to supply power externally based on power supplied from an external power supply or the backup power supply; and a discharge circuit configured to discharge power remaining in the converter based on power remaining in the backup power supply, after the supply of power from the external power supply and the backup power supply is stopped, wherein the discharge circuit includes:

a first resistor having a first end connected to the backup power supply;

a first transistor connected in series to the first resistor;

a second resistor having a first end connected between the converter and a non-volatile memory; and a second transistor connected in series to the second resistor and having a control end connected between the first resistor and the first transistor.

9. The power supply control circuit according to claim 8, further comprising:

a control circuit configured to supply power to the converter based on power supplied from the main power supply or the backup power supply;

wherein the discharge circuit is configured to discharge power remaining in the control circuit based on the power remaining in the backup power supply, after the supply of power from the main power supply and the backup power supply is stopped.

10. The power supply control circuit according to claim 9, wherein the discharge circuit further includes:

a third resistor having a first end connected between the control circuit and the converter; and a third transistor connected in series to the fourth resistor, the fourth transistor having a control end connected between the first resistor and the first transistor.

11. The memory system according to claim 1, wherein the first transistor includes an N-type transistor.

* * * * *